United States Patent [19]
Finn et al.

[11] Patent Number: 4,881,322
[45] Date of Patent: Nov. 21, 1989

[54] MACHINE AND METHOD FOR MAKING SCREW-ON CONNECTORS

[75] Inventors: Jerome W. Finn, Waterman; Robert L. Montgomery, Ridott; Frank B. Schuchard, Sycamore, all of Ill.

[73] Assignee: Ideal Industries, Inc., Sycamore, Ill.

[21] Appl. No.: 336,780

[22] Filed: Apr. 13, 1989

Related U.S. Application Data

[63] Continuation of Ser. No. 940,424, Dec. 22, 1986, abandoned, and a continuation of Ser. No. 165,032, Mar. 7, 1988, abandoned.

[51] Int. Cl.⁴ .................... H01R 43/20; B23P 19/00
[52] U.S. Cl. ........................................ 29/878; 29/747; 174/87; 206/330
[58] Field of Search ............ 29/564.1, 747, 760, 29/876, 878; 174/87; 206/330

[56] References Cited

U.S. PATENT DOCUMENTS

| 3,519,707 | 7/1970 | Krup | 174/87 X |
| 3,743,087 | 4/1973 | Wise | 174/87 X |
| 4,112,251 | 9/1978 | Scott | 29/876 X |
| 4,196,509 | 4/1980 | Del Rico | 29/747 |
| 4,528,750 | 7/1985 | Fink | 29/878 |
| 4,616,410 | 10/1986 | Stokoe et al. | 29/747 X |

Primary Examiner—Howard N. Goldberg
Assistant Examiner—Carl J. Arbes
Attorney, Agent, or Firm—Kinzer, Plyer, Dorn, McEachran & Jambor

[57] ABSTRACT

A method and machine for making screw-on connectors is disclosed. The connectors have an insulating shell with a bore open at one end and a wire coil in the bore of the shell. The method includes the steps of heating the coils sufficiently so that it in turn heats the bore of the shell in contact with it to soften the interior of the bore, and applying a compressive axial thrust between the shell and coil while the interior of the bore is still soft to force them together to a predetermined axial relation. A suitable machine for accomplishing the steps of this method is also disclosed.

22 Claims, 2 Drawing Sheets

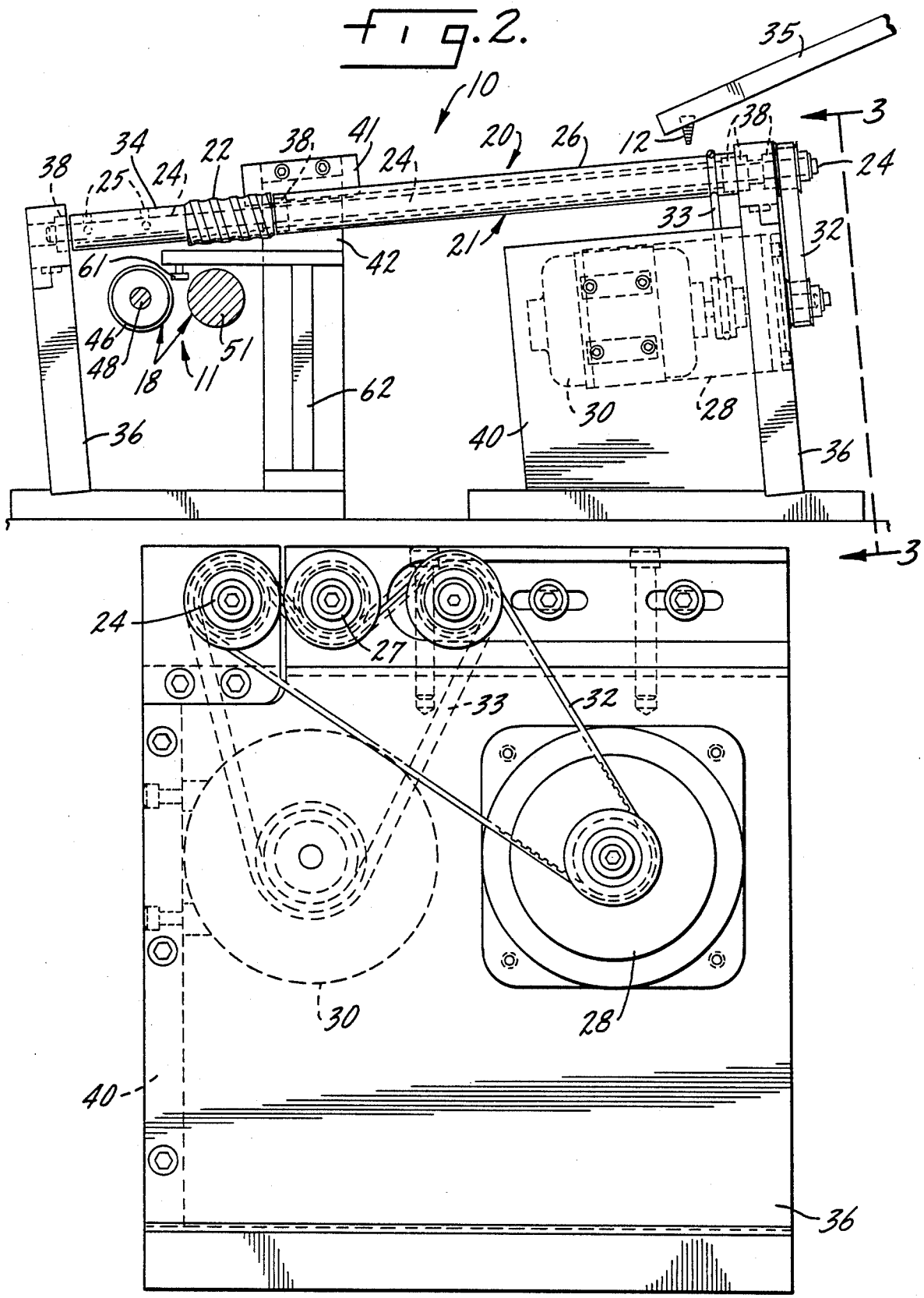

4,881,322

MACHINE AND METHOD FOR MAKING SCREW-ON CONNECTORS

This is a continuation of application Ser. No. 940,424 and 165,032 12/22/86 and 3/7/88, both abandoned.

SUMMARY OF THE INVENTION

The present invention relates to a new method of making screw-on electrical connectors and a machine for assembling screw-on electrical connectors. More particularly, the present invention is directed to a method and machine for assembling screw-on electrical connectors which have an insulating shell with an open bore at one end and a wire coil in the bore of the shell.

A primary object of the present invention is a method of making screw-on electrical connectors involving the step of heating the wire coil sufficiently so that it in turn heats the bore of the shell in contact with it to soften the interior of the bore, and the step of forcing the cap and coil together to a predetermined axial relation by applying a compressive axial thrust.

Another object is such a method wherein the wire coil is heated by the use of electromagnetic energy.

Another object is such a method of making screw-on electrical connectors wherein the shells and coils are fed separately in defined paths, the paths being brought together at an assembly station where the coils are combined with the shells, the combined coils and shells being fed through a heating station where the coil is heated sufficiently to soften some of the insulation of the shell, and then being fed through a compression station where an axial compressive thrust is applied to force the coil and shell into a predetermined axial relation.

Another object is a machine for assembling screw-on electrical connectors which have a wire coil in the bore of an insulating shell.

Another object is a machine for assembling screw-on electrical connectors that feeds the shells and coil separately in defined paths and brings them together at an assembly station.

Another object is a machine for assembling screw-on electrical connectors that accurately positions the wire coil in the bore of the insulating shell.

Another object is such a machine that feeds the wire coils into the bores of the insulating shells at a constant feed rate.

Another object is such a machine that feeds the combined shell and wire coil through a heating station at a predetermined time interval.

Another object is such a machine that has a heating station which heats the wire coil sufficiently to melt or soften the walls of the bore of the shell without burning the plating on the wire coil.

Another object is a machine that feeds the combined coil and shell to a compression station at a constant feed rate.

Another object of the invention is to provide such a machine that consistently compresses the coils into the shells at the same depth.

Another object is such a machine which indexes the coils, shells, and combined coils and shells.

Another object is such a machine which has adjustable timing.

Another object is such a machine which has a programmable computer control for adjusting feed rate, timing, and control procedures.

Another object is such a machine which assembles a predetermined number of parts per minute.

Other objects may be found in the following specification, claims and drawings.

BRIEF DESCRIPTION OF THE DRAWINGS

FIG. 2 is a side view of the coil conveyor of the machine of FIG. 1, taken along line 2—2 of FIG. 1, with parts omitted for clarity; and FIG. 3 is an end view taken along line 3—3 of FIG. 2.

DETAILED DESCRIPTION OF THE ILLUSTRATED EMBODIMENT

Figure 1:
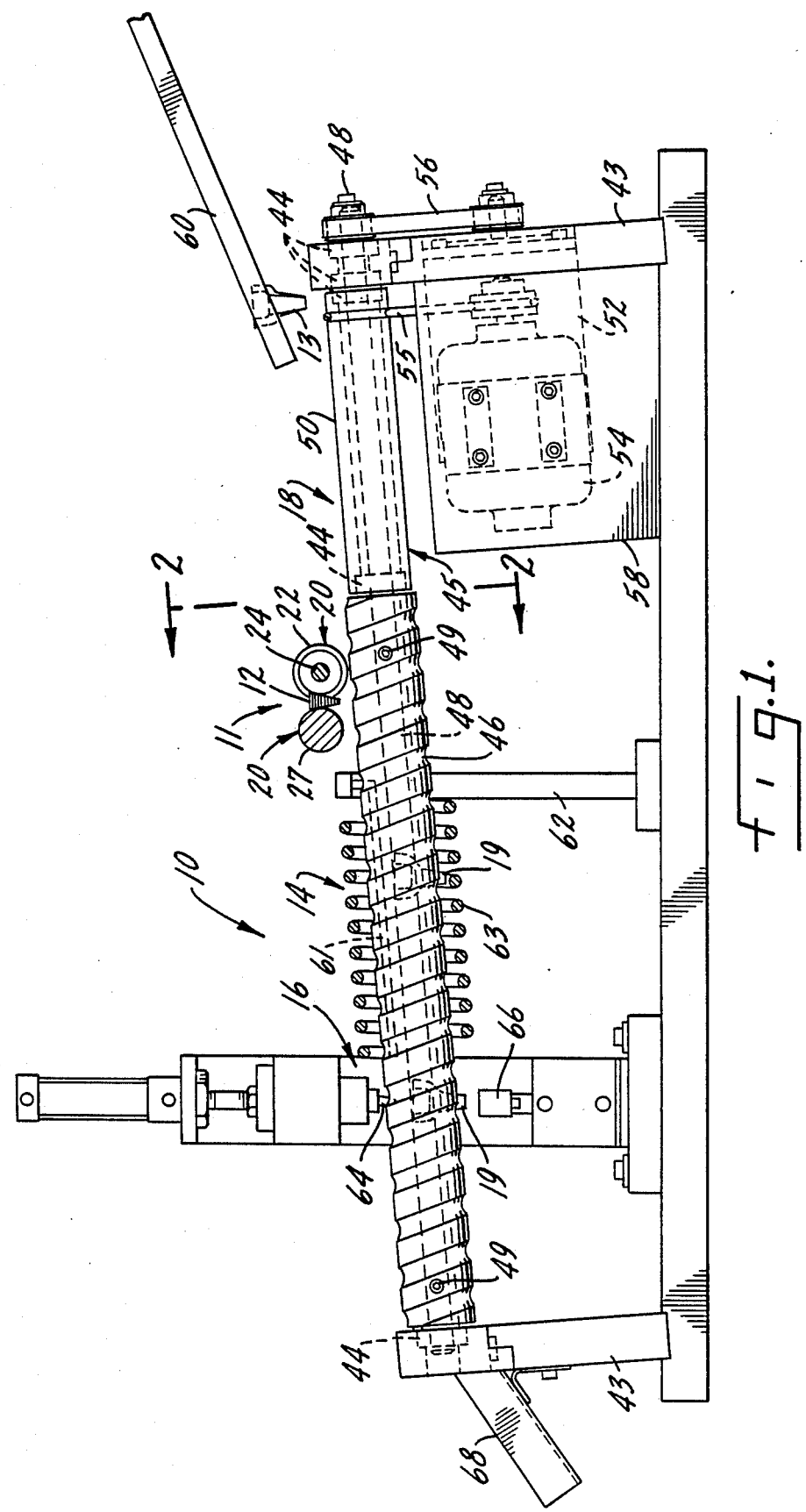
FIG. 1 is a side view of the shell conveyor of a machine embodying the principles of the present invention with parts omitted for clarity.

A machine which will accomplish all of the steps of the above described method is illustrated in FIGS. 1, 2 and 3. The illustrated machine, generally designated 10, provides an assembly station 11, where the coils 12 and shells 13 are combined, a heating station 14 and a compressing station 16. The assembly station 11, heating station 14 and compressing station 16 are all located along a shell conveyor comprising a first pair of spaced shell rails 18, between which the shells and the combined coils and shells 19 may be held and transported. At the assembly station 11, the coils 12 are delivered by a coil conveyor comprising a pair of spaced coil rails 20 disposed above the first pair of spaced shell rails 18. In the illustrated embodiment, the coil rails 20 are disposed at approximately a right angle to the shell rails 18. The coil rails are disposed so that the coils 12 may be dropped into the underlying shells 13 at the assembly station 11.

The coil rails 20, shown in FIG. 2, are slightly inclined and are spaced so that a line of coils may be supported between the rails. As shown, one of the coil rails 21 includes a rotatable coil helical groove 22 disposed substantially at the assembly station. The coil helical groove 22 serves to space and transport the individual coils 12, indexing them as it rotates. The coil helical groove is aligned with and terminated substantially over the opening between the pair of shell rails at the assembly station 11. As shown in FIG. 2, the rail 21 carrying the helical groove has an inner rod 24 to which the helical groove is secured, as by setscrews 25, so that the helical groove section 22 rotates with the rotation of the inner rod 24. Upstream of the helical groove, the coil rail 21 has a sleeve 26 which is rotatable with respect to the inner rod 24.

The second coil rail 27 of the pair need not be of the same construction as the rail 21 carrying the helical groove 22. In the illustrated embodiment, the second coil rail 27 comprises a rotatable rod.

The coil rails are driven for rotation by a first pair of motors, one being a stepping motor 28, for driving the inner rod 24 and helical groove section 22 of the rail 21, the other being a DC variable speed motor 30, for driving the sleeve 26 of the rail 21 and the second rail 27. As shown in FIG. 3, the stepping motor 28 drives the inner rod 24 through a cog belt 32, and the variable speed motor 30 drives the sleeve 26 and the second rail 27 through an O-ring belt 33. With the illustrated arrangement, the variable speed motor 30 may be set to drive the second rail 27 and the sleeve 26 of the first rail 21 at a constant speed, while the helical groove section 22 of the first rail 21 is separately driven to rotate independently and intermittently on an index basis, at a predetermined speed and at predetermined intervals. With this arrangement, the coils are delivered to the assembly station at a constant feed rate.

The coil rails 20 are of such a diameter and are so spaced as to support and hold a line of coils between the two rails. However, at the downstream end 34 of the helical groove section 22, the rails are of a reduced diameter, so that the coils may drop from the coil rails down to the underlying shell rails 18, for assembly with the underlying shells.

Feed means 35 are provided at the upstream end of the coil rails 20 to deliver a line of coils 12 onto the coil rails. Any suitable feed means, such as an electrically-vibrated bowl and chute, may be used to drop the coils onto the coil rails 20. The feed means should deliver a stream or line of individual coils, all vertically disposed.

As shown in FIG. 2 the coil rail 20 may be rotatably supported on a suitable frame 36 with bearings 38 at the ends of the rails to facilitate rotation. In the illustrated embodiment, bearings 38 are also provided at intermediate points along the length of the rail 21 to rotatably support the sleeve 26 on the inner rod 24. The rails 20 are parallel to each other and slope downwardly from the upstream end to facilitate downstream travel of the coils. As shown, the motor 28 is supported on the support frame 36 and the motor 30 is supported on a mounting plate 40.

In the illustrated embodiment, a coil guide 41 is provided, comprising a vertically-disposed plate having an edge overlying the coils. The overlying edge of the plate is sloped substantially the same as the slope of the coil rails 20. The coil guide commences near the upstream end of the coil helical groove 22, and extends upstream. The coil guide serves to hold the coils down between the coil rails, to prevent the coils from popping out as they are picked up by the helical groove. The illustrated coil guide is supported by suitable frame elements 42 overlying the rails and extending downwardly along one side of the rails.

As discussed above, the spaced coils drop from the coil rails 20 and into the shells 13 on the shell rails 18 at the assembly station. As shown in FIG. 1, the shell rails 18 are spaced and have diameters such that the shells are supported between the rails. The shell rails 18 are rotatable and are supported on a support frame 43 with bearings 44 at the ends of the rails to facilitate rotation. The rails 18 are parallel to each other and are supported on the frame such that they slope downwardly in the downstream direction, to facilitate downstream travel of the shells 13.

In the illustrated embodiment, one of the rails 45 has a shell helical groove portion 46 extending from its downstream end past the assembly station 12. The shell helical groove portion 46 is secured to an inner core or rod 48 of the rail 45, as by screws 49, so that the helical portion 48 rotates with the rotation of the inner rod 48. The shell helical groove portion 46 serves to space and transport the individual shells, indexing them as it rotates. Upstream of the helical portion, the inner rod 48 is covered by a relatively rotating sleeve 50 which comprises a smooth surface. In the illustrated embodiment, additional bearings 44 are provided to rotatably support the sleeve 50 on the inner rod 48.

The second shell rail 51 of the pair 18 need not be of the same construction as the first rail 45. In the illustrated embodiment, the second rail 51 comprises a rotatable rod.

The shell rails are driven by a second pair of motors, one being a stepping motor 52, for driving the inner rod 48 of the first rail 45 and the shell helical groove 46, the other being a DC variable speed motor 54 for driving the sleeve 50 of the first shell rail 45 and the second shell rail 51. In the illustrated embodiment, the variable speed motor 54 drives the sleeve 50 and the second rail 51 through an O-ring belt 55, and the stepping motor 52 drives the rod 48 through a cog belt 56. As shown, the stepping motor 52 is supported on the support frame 43 and the variable speed motor 54 is supported on a mounting plate 58.

As with the coils, feed means 60 for the shells are included at the upstream end of the shell rails 18. A vibrating bowl apparatus and chute may be used to drop a stream of individual shells onto the shell rails. All of the shells should be vertically-disposed on the shell rails, with their bores facing upwardly.

In the illustrated embodiment, a retainer strip 61 overlies the combined coils and shells; it extends from the downstream end of the assembly station 11, through the heating station 14, and terminates before the compression station 16. The retainer strip serves to hold the combined coils and shells down and to keep the coils in the shells. The retainer strip is preferably made of nylon or plastic so that it is not affected by the heating unit. To hold the retainer strip above the combined coils and shells, frame elements 62 are included, overlying the rails and extending downwardly along one side of the rails.

It is necessary to synchronize the feeding of the individual coils and shells to the assembly station so that a single shell is present on the shell rails at the assembly station to receive a single coil dropped from the coil rails; the shells and coils should be delivered to the assembly station at a constant feed rate; this may be accomplished by synchronizing the rotation of the helical portions 22, 46 of the coil rails 20 and shell rails 18. To synchronize the rotation of the two helical portions 22, 46, the timing of the two stepping motors 28, 52 should be synchronized. Thus, in the illustrated embodiment, the two sets of motors 28, 30, 52, 54 serve as a means for rotating and synchronizing the pairs of rails so that a shell is under each coil to receive it when it is dropped from the coil rails.

The rotation of the helical portion 46 of the shell rails 18 is also related to the operation of the heating station 14 and compressing station 16. The intermittent rotation of the helical portion 46 feeds the combined shell and coil through the heating station at a predetermined rate of speed, thereby determining heating time. The operation of the compressing station should also be synchronized with the rotation of the helical portion so that the compressing station operates on each successive coil and shell combination. A programmable computer control (not illustrated) may be used for this purpose.

In the illustrated embodiment the heating station 14 comprises an induction heating unit 63. The induction heating unit utilizes electromagnetic energy to heat the metal coil, while not directly heating the shell. As the coil is heated by the heating unit, the coil in turn heats the bore of the shell in contact with it to soften the interior of the bore.

From the heating station 14 the combined shell and coil are fed downstream to the adjacent compressing station 16 where the coil is compressed into the softened interior of the shell's bore. As shown in FIG. 1, the illustrated compressing station 16 includes a pair of plungers: an upper punch of plunger 64 is adapted to lower and enter the interior of the shell's bore to contact the coil and compress the coil against the softened interior bore of the shell; a lower punch 66 or plunger is adapted to simultaneously raise and hold the shell slightly off of the rail so that the rails do not bear the compressing load. The combined effect of the upper and lower plungers is to apply an axial compressive thrust between the shell and the coil, forcing them into a predetermined axial relation. Thus, the compressing station firmly sets each coil in each shell.

In the illustrated embodiment, the compressing station 16 uses an air operated punch with a fixed stop so that the plungers work at a constant stroke, thereby always setting the coils at the same depth in the shells. The compressing unit should be synchronized with the movement of the helical portion 46 of the shell rails 18 such that the upper and lower plungers raise and lower as each successive shell and coil combination reaches the station. After the compressing operation, the lower and upper plungers release the combined shell and coil which is then carried by the rails further downstream to an outlet 68 from which the combined coil and shell can be collected.

Either set of rails 18 or 20 can be made of plastic, nylon or steel, but plastic is a particularly good material to use on the shell rails because the induction heating will not heat the plastic rail. The shapes of the helical groove portions 22, 46 may vary with the sizes and shapes of the parts to be combined. It should be understood that the principles of the present invention may be utilized to manufacture articles with more than two parts by providing additional sets of rails and additional assembly stations. Additional operations can be performed on the articles by providing additional stations along the rails.

In the illustrated embodiment, the support of both ends of both sets of rails 18, 20, on the support frames 36, 43, is substantially the same as that shown in FIG. 3. With the illustrated arrangement, the distances between the rails of each pair may be adjusted to accommodate parts of different size.

The use, operation and function of the invention are as follows:

In the accompanying drawings there is illustrated a machine for making screw-on electrical connectors of the type having an insulating shell with an open bore at one end and a wire coil in the bore of the shell, such as disclosed in Ser. No. 874,072, filed June 13, 1986. The illustrated machine performs the steps of the method of making screw-on electrical connectors of the present invention.

The present invention provides a method of making screw-on electrical connectors of the type having an insulating shell or cap with an open bore at one end and a wire coil in the bore of the shell. Generally the method of the present invention employs the step of heating the wire coil sufficiently so that it in turn heats the bore of the insulating shell in contact with it, to soften the interior of the bore. While the interior of the bore is still soft, a compressive axial thrust is applied between the shell and the wire coil to force the coil into the shell at a predetermined axial relation. In the preferred method of the present invention, the shell and coil are combined prior to heating the coil, and the coil is heated while it is inside the bore of the shell. It is preferred to heat the coil by the use of electromagnetic energy, as by induction heating.

It is also preferred in the method of the present invention that the wire coils and shells be fed separately along defined paths, which are brought together at an assembly station. At the assembly station the coils are combined with the shells, and the combined coils and shells are then fed through heating and compressing stations.

At the heating station the coil should be heated sufficiently to soften the plastic but not burn the plating on the wire coil. The heating temperature and the heating time can both be adjusted to accomplish this end. The proper temperature and time can be determined by heating the coil to the point where the plating on the coil is discolored, and then adjusting the time and temperature to a point below the point where the coil was discolored.

In operation, the respective feed means 35, 60 deliver streams of upwardly-disposed coils 12 and shells 13 onto the coil rails 20 and shell rails 18. The rotation of the second coil rail 27 and the sleeve 26 of the first coil rail 21 move the stream of coils downstream to the helical groove portion 22. Similarly, the rotation of the second shell rail 51 and the sleeve 50 of the first shell rail 45 move the stream of shells downstream to the helical groove portion 46 of the shell rails 18. The stepping motors 28, 52 intermittently rotate the respective helical groove portions 22, 46, and individual coils and shells are transported by the helical grooves; the coils and shells are thus spaced, indexed and upwardly-disposed. When a coil reaches the end of the helical groove section 22 of the coil rails at the assembly station, it drops downwardly, since the rails are of a reduced diameter. Since the rotation of the shell rails is synchronized, an empty shell is present on the shell rails at the assembly station, and the coil drops into the awaiting shell. Thus, the coils are accurately positioned in the bores on the shells.

The intermittent rotation of the helical groove portion 46 of the shell rails transports the combined coil and shell through the heating station, where the electromagnetic energy heats the coil. The heated coil warms and softens the interior of the shell bore.

The intermittent rotation of the helical groove portion 46 of the shell rails then transports the combined shell and coil to the compressing station 16, where the lower plunger 66 raises up, raising the combined shell and coil off of the rails; the upper plunger 64 lowers into the bore of the shell to a predetermined position, applying a compressive axial thrust to the coil, and thereby embedding the coil into the interior of the shell. The upper plunger 64 then raises, and the lower plunger 66 lowers, to replace the shell on the shell rails. The intermittent rotation of the helical groove portion 46 then transports the finished shell downstream to the outlet 68. Since the coil rails and shell rails feed the shells, coils and combined shells and coils at a constant rate, these operations are performed upon each successive coil and shell.

Additional modifications and/or additions may be included by those skilled in the art without departing from the scope of the invention as defined by the claims.

I claim:

1. A method of making screw on connectors which have an insulating shell with a tapered bore open at one end and a tapered wire coil in the bore of the shell, including the steps of putting the coil in the bore of the shell, heating the coil sufficiently such that it in turn heats the bore of the shell in contact with it to soften the interior of the bore, thereafter applying a compressive axial thrust between the tapered bore of the shell and coil while the interior of the bore is still soft to force the coil further into the bore of the shell, and stopping the axial thrust when the coil and shell are in a predetermined axial relationship.

2. The structure of claim 1 further characterized by and including the step of combining the shell and coil prior to heating the coil, and heating the coil while it is inside of the shell.

3. A method of making screw on connectors which have an insulating shell with a bore open at one end and a wire coil in the bore of the shell, including the steps of feeding the shells and coils separately in defined paths, bringing the paths together at an assembly station where the coils are combined into the shells, feeding the combined coils and shells through a heating station, heating the coil and shell at the heating station sufficiently to soften some of the insulation of the shell, and applying an axial compressive thrust between the shell and coil to force them together to a predetermined axial relation.

4. A method of making screw on connectors which have an insulating shell with a bore open at one end and a wire coil in the bore of the shell, including the steps of feeding the shells and coils separately in defined paths, bring the paths together at an assembly station where the coils are combined into the shells, and heating the coils and the shells sufficiently to soften some of the bore of the shells and applying an axial compressive thrust between the coils and shells to force them together to a predetermined axial relation.

5. The method of claim 4 further characterized in that applying an axial thrust is separate from heating the coils and shells.

6. The method of claim 4 further characterized in that applying an axial thrust takes place subsequent to heating the coils and shells.

7. In a machine for assembling screw on electrical connectors which have a wire coil in the bore of an insulating shell that is closed at one end and open at the other, a pair of paired rotatably mounted spaced rails, one pair for the coils and the other pair for the shells, the pairs being constructed and arranged to accept and support a line of the coils and shells, an assembly station where the pairs of paired rails are brought together with the coil rails above the shell rails so that the coils may be dropped into the shells, a helical groove on at least one of the rails of each pair at the assembly station to support and space the individual coils and shells and to feed them when the rails are rotated, the coil helical groove being aligned with and terminating over the opening between the shell rails, and means for rotating and synchronizing the rails so that a shell will be under each coil to receive it when it is dropped by the coil rails.

8. The machine of claim 7 further characterized by and including a heating station after the assembly station for heating the coils and shells.

9. The structure of claim 8 further characterized in that the heating station is an induction heating unit.

10. The machine of claim 7 further characterized by and including a compression station after the heating station to apply an axial compressive force between each coil and shell to firmly set the coil in the shell.

11. The machine of claim 10 further characterized by and including means for raising the coils and shells up off of the rails during compression at the compression station so that none of the compressive load will be transmitted to the rails.

12. The machine of claim 7 in which the pair of paired rails are both disposed on an incline.

13. The structure of claim 7 further characterized in that the means for rotating and synchronizing the rails rotates at least some of them on an intermittent basis.

14. The structure of claim 7 further characterized by and including a hold down between each of the pairs of rails and slightly above the path of movement of the coils and shells to prevent coils and shells from being dislodged upwardly from the rails.

15. In a machine for making screw on connectors which have an insulating shell with a bore open at one end and a wire coil in the bore of the shell, a frame, means on the frame for feeding the shells and coils separately in defined convergent paths, an assembly station where the paths converge and the coils are assembled into the shells, a heating station, means for feeding the combined coils and shells to the heating station, heating means at the heating station for heating the coils and shells sufficiently to soften some of the insulation of the shells, and means for thereafter applying an axial compressive thrust between the coils and shells to force them together to a predetermined axial relation.

16. The structure of claim 13 further characterized in that the defied convergent paths are disposed generally at right angles to each other.

17. The structure of claim 15 further characterized in that the heating means is an induction heating unit.

18. The structure of claim 15 further characterized in that the means for feeding the combined coils and shells includes a pair of paired rotatably mounted spaced rails, one pair for the coils and the other pair for the shells, a helical groove on at least one of the rails of each pair at the assembly station to support and space the individual coils and shells and to feed them when the rails are rotated, the coil helical groove being aligned with and terminating over the. opening between the shell rails, and means for rotating and synchronizing the rails so that a shell will be under each coil to receive it when it is dropped by the coil rails.

19. The structure of claim 15 further characterized by and including means at the compression station for raising the coils and shells up off of the feeding means so that none of the compressive load will be transmitted to the feeding means.

20. In a machine for making screw on electrical connectors which have an insulating shell with a bore open at one end and a wire coil in the bore of the shell, a frame, means on the frame for feeding the shells and coils separately in defined convergent paths, an assembly station where the paths converge and the coils are assembled into the shells, means for feeding the combined coils and shells to a working area, and means at the working area for heating the coils and shells sufficiently to soften some of the insulation in the bore of the shells and for applying an axial compressive thrust between the coils and shells to force them together to a predetermined axial relation.

21. The structure of claim 20 further characterized in that the means for heating the coils and shells are separate from the means for applying an axial compressive thrust between the coils and shells.

22. The structure of claim 20 further characterized in that the means for applying an axial thrust between the coils and shells operates subsequent to the means for heating the coils and shells.

* * * * *